United States Patent [19]

Togino

[11] Patent Number: 5,923,477
[45] Date of Patent: Jul. 13, 1999

[54] IMAGE DISPLAY APPARATUS HAVING A REFLECTING SURFACE THAT BENDS LIGHT RAYS

[75] Inventor: Takayoshi Togino, Koganei, Japan

[73] Assignee: Olympus Optical Co., Ltd., Tokyo, Japan

[21] Appl. No.: 08/385,129

[22] Filed: Feb. 7, 1995

[30] Foreign Application Priority Data

Feb. 7, 1994 [JP] Japan .................................. 6-013802

[51] Int. Cl.⁶ .................................................. G02B 27/14
[52] U.S. Cl. .................................... 359/631; 359/637
[58] Field of Search .................................. 359/630, 631, 359/632, 633, 639, 637, 640; 345/7, 8

[56] References Cited

U.S. PATENT DOCUMENTS

| | | | |
|---|---|---|---|
| 3,697,154 | 10/1972 | Johnson | 350/174 |
| 4,775,217 | 10/1988 | Ellis | 359/404 |
| 4,854,688 | 8/1989 | Hayford | 359/433 |
| 4,961,626 | 10/1990 | Fournier | 359/630 |
| 4,968,123 | 11/1990 | Fournier | 359/630 |
| 4,969,714 | 11/1990 | Fournier | 353/174 |
| 5,013,134 | 5/1991 | Smith | 350/174 |
| 5,039,213 | 8/1991 | Yamada et al. | 359/629 |
| 5,124,821 | 6/1992 | Antier et al. | 359/14 |
| 5,384,654 | 1/1995 | Iba | 359/364 |
| 5,436,765 | 7/1995 | Togino | 359/631 |
| 5,459,612 | 10/1995 | Ingleton | 359/630 |
| 5,467,205 | 11/1995 | Kuba | 359/40 |
| 5,479,224 | 12/1995 | Yasugaki | 353/101 |
| 5,483,307 | 1/1996 | Anderson | 353/98 |
| 5,499,139 | 3/1996 | Chen et al. | 359/649 |
| 5,513,041 | 4/1996 | Togino | 359/631 |
| 5,526,183 | 6/1996 | Chen | 359/629 |

FOREIGN PATENT DOCUMENTS

| | | |
|---|---|---|
| 7039 | 1/1980 | European Pat. Off. . |
| 531121 | 3/1993 | European Pat. Off. . |
| 3101709 | 4/1991 | Japan . |

OTHER PUBLICATIONS

Japanese Abstract No. 6–194598 dated Jul. 15, 1994 (corresponds to USP 5,479,224 cited in Form PTO–892 attached to the Official Action dated Apr. 12, 1996).
Japanese Abstract No. 6–315125 dated Nov. 8, 1994 (corresponding to USP 5,467,205 cited in Form PTO–892 attached to the Official Action dated Apr. 12, 1996).
Yano: "Psychological Effects of Visual Angle for Stereoscopic Images", Journal of the Institute of Television Engineers, vol. 45, No. 12, pp. 1589–1596 (1991).

*Primary Examiner*—David C. Nelms
*Assistant Examiner*—Ricky Mack
*Attorney, Agent, or Firm*—Cushman, Darby & Cushman IP Group of Pillsbury, Madison & Sutro LLP

[57] ABSTRACT

A compact image display apparatus having a wide exit pupil diameter, which enables observation of an image that is flat and clear as far as the edges of visual field at a field angle of 40° or more. The apparatus includes an image display device (8) for displaying an image, a relay optical system (7) for relaying the image to form a relay image, and an ocular optical system having a reflecting surface (2) that bends a bundle of light rays emanating from the relay optical system (7) and forming an exit pupil (1) of the relay image. The ocular optical system has an entrance-side optical surface (6) provided in an optical path extending from the relay optical system (7) to the reflecting surface (2), and an exit-side optical surface (5) provided in an optical path along which the ray bundle bent by the reflecting surface travels to reach the exit pupil (1) and having a power different from that of the entrance-side optical surface (6).

34 Claims, 15 Drawing Sheets

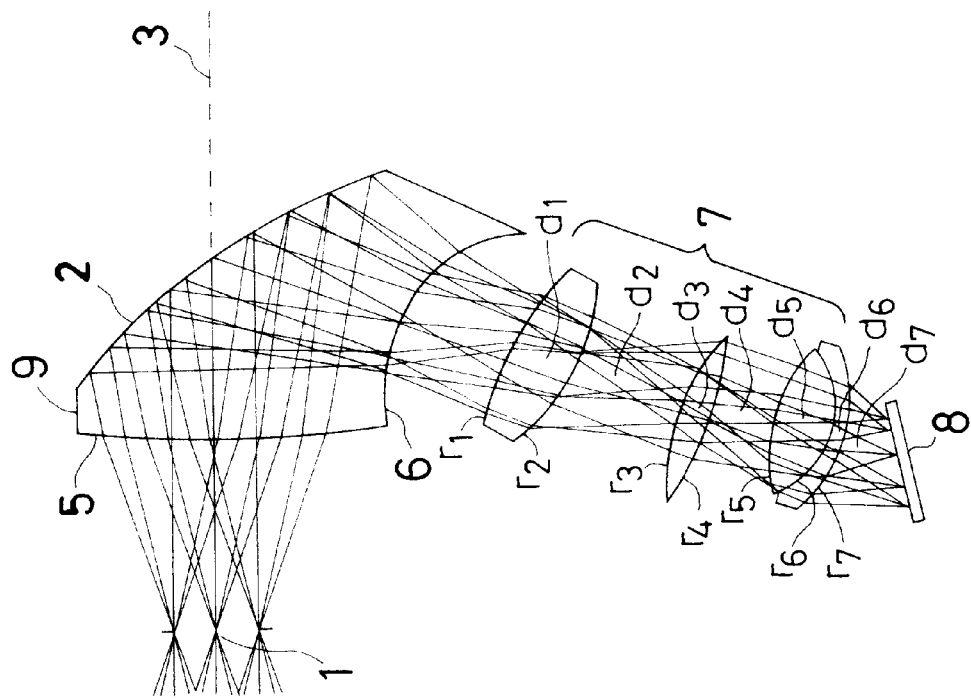
FIG. 1
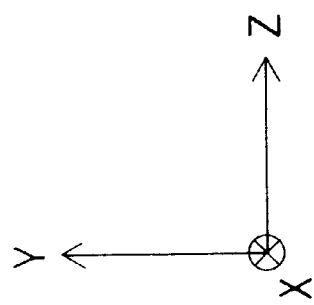

41 Partially transmitting -reflecting surface

42 Semitransparent film

43 Polarizing semi- transparent film

IMAGE DISPLAY APPARATUS HAVING A REFLECTING SURFACE THAT BENDS LIGHT RAYS

BACKGROUND OF THE INVENTION

The present invention relates to an image display apparatus and, more particularly, to a head- or face-mounted image display apparatus that can be retained on the observer's head or face.

For a head-mounted image display apparatus, it is important to minimize the overall size and weight thereof in order to make the observer feel comfortable when wearing it. An essential factor in determining the overall size of the apparatus is the layout of the optical system.

FIG. 15 shows the optical system of one conventional head-mounted image display apparatus [Japanese Patent Application Laid-Open (KOKAI) No. 3-101709 (1991)]. In this image display apparatus, an image that is displayed by a two-dimensional image display device is transmitted as an aerial image by a relay optical system including a positive lens, and the aerial image is projected into an observer's eyeball as an enlarged image by an ocular optical system formed from a concave reflecting mirror. There has also been known a direct-vision layout in which an enlarged image of a two-dimensional image display device is observed directly through a convex lens. With these conventional layouts, the amount to which the apparatus projects from the observer's face is unfavorably large. Further, it is necessary in order to provide a wide field angle for observation to use a positive lens having a large diameter and a large two-dimensional image display device. Accordingly, the apparatus inevitably becomes increasingly large in size and heavy in weight.

To enable the observer to use the image display apparatus for a long time without fatigue and to attach and detach the apparatus with ease, it is preferable to adopt an arrangement in which a short and lightweight ocular optical system is disposed immediately in front of the observer's eyeball. With this arrangement, a two-dimensional image display device, an illuminating optical system, etc. can be disposed so that the apparatus projects forwardly from the observer's head to a minimal extent. Thus, it is possible to reduce the amount of projection of the apparatus and also the weight thereof.

Next, it is necessary to ensure a wide field angle in order to enhance the feeling of being at the actual spot which is given to the observer when viewing the displayed image. In particular, the stereoscopic effect of the image presented is determined by the angle at which the image is presented [see The Journal of the Institute of Television Engineers of Japan Vol. 45, No. 12, pp. 1589–1596 (1991)]. The next matter of great concern is how to realize an optical system which provides a wide field angle and high resolution. It is known that it is necessary in order to present a stereoscopic and powerful image to the observer to ensure a field angle of 40° (±20°) or more in the horizontal direction, and that the stereoscopic and other effects are saturated in the vicinity of 120° (±60°). In other words, it is preferable to select a field angle which is not smaller than 40° and which is as close to 120° as possible. However, in a case where the above-described ocular optical system is a plane reflecting mirror, it is necessary to use an extraordinarily large two-dimensional image display device in order to make light rays incident on the observer's eyeball at a field angle of 40° or more. After all, the apparatus increases in both the overall size and weight.

Further, since a concave mirror produces a strong concave curvature of field along the surface of the concave mirror because of its nature, if a planar two-dimensional image display device is disposed at the focal point of a concave mirror, the resulting observation image surface is curved, so that it is impossible to obtain an image for observation which is clear as far as the edges of the visual field.

Thus, it has heretofore been difficult to realize a compact and lightweight image display apparatus which is capable of presenting the observer an image which is clear as far as the edges of the visual field at a wide field angle.

In view of the above-described problems of the conventional technique, the present invention aims at providing a compact and lightweight image display apparatus having high resolution and a large exit pupil diameter, which enables observation of an image at a wide field angle.

The problems associated with the conventional technique will be explained below more specifically. Aberrations which are produced in an ocular optical system formed from a decentered concave reflecting mirror may be roughly divided into those which directly affect the image-forming performance, e.g., field curvature, astigmatism, coma, etc., and pupil aberration, which is not directly related to the image-forming performance.

The aberrations which directly affect the image-forming performance can be corrected to a certain extent by employing a decentered surface or an aspherical surface in the relay optical system. However, pupil aberration, which is not directly related to the image-forming performance, cannot be corrected by using a decentered surface or an aspherical surface in the relay optical system. This means that the entrance pupil of the ocular optical system, which is in imagery relation to the observer's pupil position, fails to coincide with the exit pupil of the relay optical system, and that the exit pupil diameter of the relay optical system must be enlarged to a considerable extent. If the pupil diameter of the relay optical system is not satisfactorily large, the edges of visual field is eclipsed, and no adequate resolution can be obtained. To cope with these problems, the pupil diameter of the relay optical system must be enlarged. However, an increase in the pupil diameter of the relay optical system causes the load on the relay optical system to be considerably increased. As a result, the relay optical system becomes disadvantageously large in size and complicated in arrangement.

The way in which pupil aberration occurs will be explained below with reference to FIG. 12, in which illustration of a relay optical system is omitted. FIG. 12 shows pupil aberration produced by a conventional ocular concave mirror, which is a surface-coated mirror. In the figure, reference numeral 1 denotes an observer's pupil position, 2 a concave reflecting mirror, 3 an observer's visual axis lying when the observer sees forward, and 4 a pupil position where an image of the observer's pupil is projected by the concave mirror 2. A coordinate system is defined with respect to the drawing in such a way that the plane of the drawing is taken as YZ-plane, and a perpendicular extending from the obverse surface to the reverse surface of the drawing in a direction perpendicular to the plane of the drawing is taken as X-axis. The figure shows ray tracing carried out with the observer's pupil diameter assumed to be 12 millimeters.

FIG. 13(a) shows ray tracing in which only axial rays are traced with the observer's pupil taken as an object point. In FIG. 13(a), reference numeral 1 denotes an observer's pupil position, 2 an ocular concave mirror, 3 an observer's visual axis lying when the observer sees forward, and 4 a pupil position where an image of the observer's pupil is projected by the concave mirror 2, in the same way as in the case of FIG. 12. FIG. 13(b) shows where chief rays 11 to 15 in FIG. 13(a) lie in the image field according to the field angle.

FIG. 14(a) shows the rays in FIG. 13(a) as projected on the XZ-section. In FIG. 14(a), reference numeral 1 denotes an observer's pupil position, 2 an ocular concave mirror, and 3 an observer's visual axis lying when the observer sees forward, in the same way as in the case of FIGS. 12 and 13(a). FIG. 14(b) shows where rays 21 to 23 and 31 to 33 in FIG. 14(a) lie in the image field according to the field angle.

It will be understood from FIG. 14(a) that the ray 21 in particular has aberration in the Z-axis direction. Thus, it will be understood that in FIG. 12 a relay lens having a large effective aperture and satisfactorily corrected for aberration is needed in order to enable an image lying leftward of the observer's right eye to be displayed without being eclipsed, and hence the load on the relay lens increases.

SUMMARY OF THE INVENTION

The present invention has been made to solve the above-described problems, and an object of the invention is to provide a compact image display apparatus having a wide exit pupil diameter, which enables observation of an image that is flat and clear as far as the edges of visual field at a field angle of 40° (±20°) or more.

To attain the above-described object, the present invention provides an image display apparatus including an image display device for displaying an image, a relay optical system for relaying the image to form a relay image, and an ocular optical system having a reflecting surface that bends a bundle of light rays emanating from the relay optical system and forming an exit pupil of the relay image. The ocular optical system has at least an optical surface of positive power in an optical path along which the ray bundle bent by the reflecting surface travels to reach the exit pupil.

In addition, the present invention provides an image display apparatus including an image display device for displaying an image, a relay optical system for relaying the image to form a relay image, and an ocular optical system having a reflecting surface that bends a bundle of light rays emanating from the relay optical system and forming an exit pupil of the relay image. The ocular optical system has an entrance-side optical surface provided in an optical path extending from the relay optical system to the reflecting surface, and an exit-side optical surface provided in an optical path along which the ray bundle bent by the reflecting surface travels to reach the exit pupil and having a power different from that of the entrance-side optical surface.

In addition, the present invention provides an image display apparatus having a face-mounted unit which includes an image display device for displaying an image, a relay optical system for relaying the image to form a relay image, and an ocular optical system having a reflecting surface that bends a bundle of light rays emanating from the relay optical system and forming an exit pupil of the relay image. The image display apparatus further has a support member for retaining the face-mounted unit on the observer's head. The ocular optical system has at least an optical surface of positive power in an optical path along which the ray bundle bent by the reflecting surface travels to reach the exit pupil.

In any of the above-described image display apparatuses, it is desirable that the optical surface of positive power should be formed from a positive lens.

The arrangement may be such that the entrance-side optical surface of the ocular optical system has a negative power, and the exit-side optical surface has a positive power. The entrance-side optical surface may have a negative power and be provided in the vicinity of the relay image. The entrance-side optical surface, the exit-side optical surface and the reflecting surface may be integrated in the form of a prism with an optical member having a refractive index (n) larger than 1 (n>1) put therebetween.

The reflecting surface may be a totally reflecting surface that reflects a bundle of incident light rays, or a semitransparent reflecting surface that transmits a part of a bundle of incident light rays and reflects the rest of it.

The reflecting surface may be a concave reflecting mirror having a positive power.

It is desirable that the relay optical system should be formed from a plurality of optical elements, and that at least one of the optical elements should be decentered with respect to an axis perpendicular to the image of the display device.

In addition, the present invention provides an image display apparatus including an image display device for displaying an image, a relay optical system for relaying the image to form a relay image, and an ocular optical system having a reflecting surface that bends a bundle of light rays emanating from the relay optical system and forming an exit pupil of the relay image. The ocular optical system includes a back-coated mirror having at least two optical surfaces provided to face opposite to the reflecting surface.

It should be noted that the above-described semitransparent reflecting surface may be a surface composed of transmitting and reflecting regions which are locally divided from each other, or a surface formed from a semitransparent thin film, e.g., a metallic thin film or a dielectric multilayer film, which divides the quantity of incident light.

Further, the reflecting surface is preferably an aspherical or anamorphic surface. When the reflecting surface is an anamorphic surface, it is preferable to satisfy the following condition:

$|R_x|<|R_y|$ where $R_x$ is the paraxial curvature radius in the X-axis direction, and $R_y$ is the paraxial curvature radius in the Y-axis direction.

Further, it is preferable to satisfy the following condition:

$D>0.5 \times F_R$ where D is the distance between the reflecting surface and the exit pupil, and $F_R$ is the focal length of the reflecting surface.

It is also preferable to satisfy the following condition:

D>30(millimeters)

where D is the distance between the reflecting surface and the exit pupil.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a sectional view taken along the YZ-plane, showing an image display apparatus for the observer's right eye according to Example 1 of the present invention.

DESCRIPTION OF THE PREFERRED EMBODIMENTS

The function of the present invention will be explained below. The following explanation will be made along an optical path of backward tracing in which light rays are traced from the observer's pupil position toward the two dimensional display device for the convenience of designing the optical system.

Figure 14:
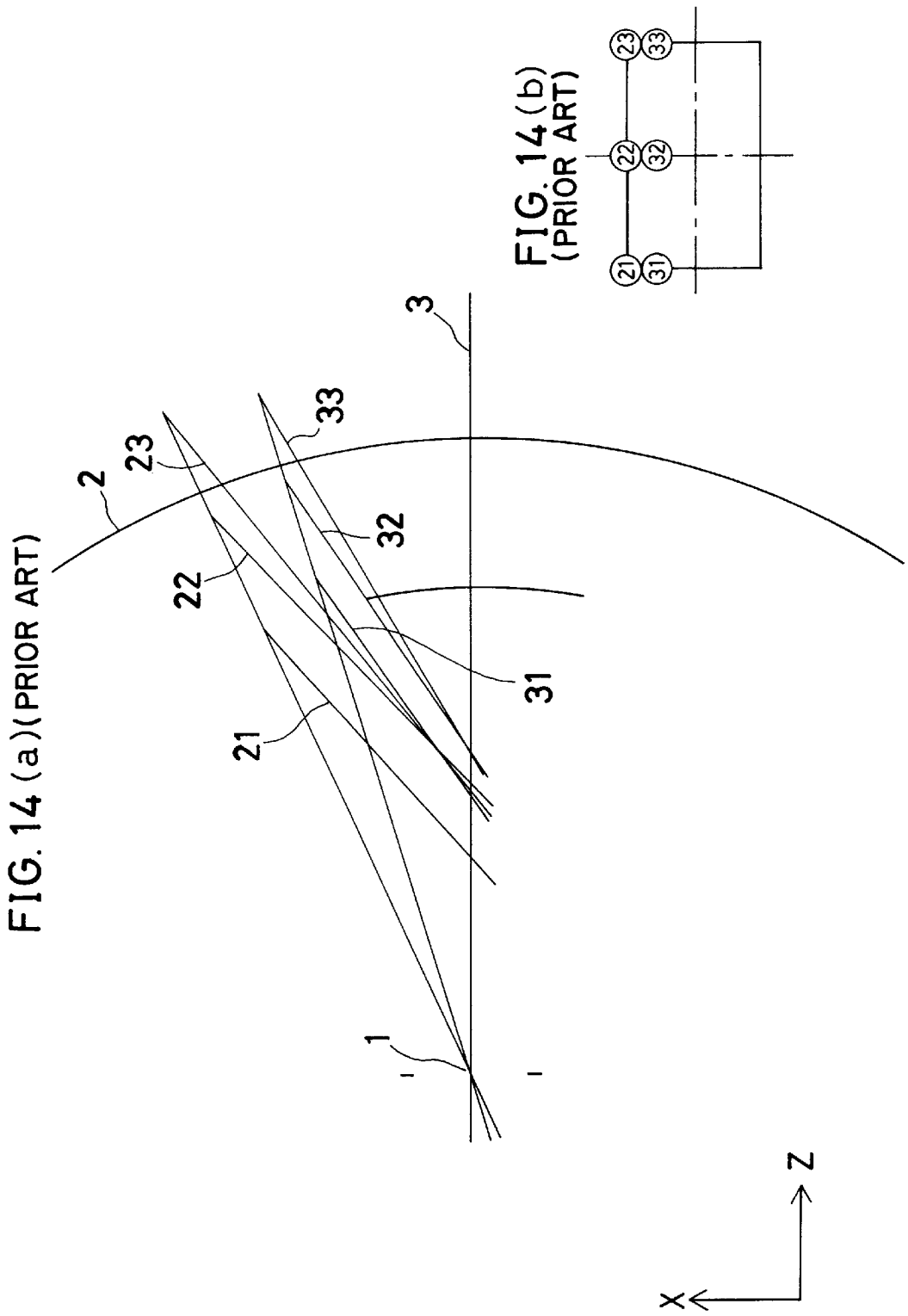
FIG. 14(a) shows light rays in FIG. 13(a) as projected on the XZ-section.
FIG. 14(b) shows where the rays in FIG. 14(a) lie in the image field according to the field ingle.
Figure 15:
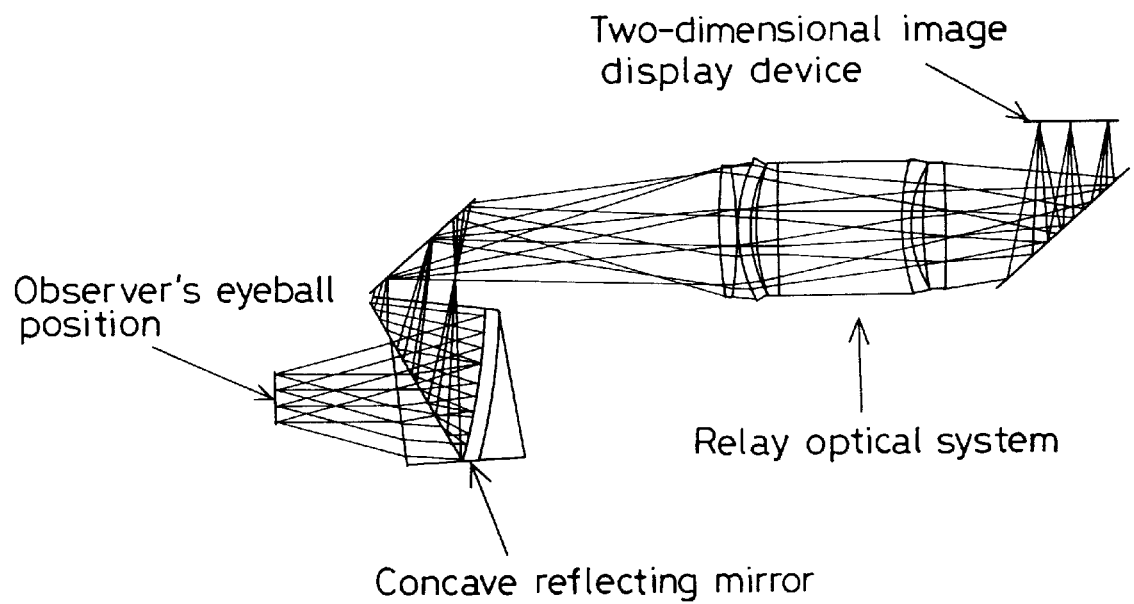
FIG. 15 shows an optical syst of one conventional head-mounted image display apparatus.

In an ocular optical system formed from a concave reflecting mirror, as shown in FIG. 14(a), chief rays at various image heights, which diverge from the pupil position 1, largely differ from each other in the distance through which they travel before striking the reflecting surface 2. More specifically, the rays 21 and 31 in FIG. 14(a) strike and reflect from the concave reflecting mirror 2 at an early stage before the rays diverge to a substantial extent. Therefore, the intersections between the rays 21 and 31 and the Z-axis are undesirably closer to the pupil position 1. On the other hand, the other rays travel relatively long distances before striking the reflecting surface 2. Therefore, the intersections between these rays and the Z-axis are relatively away from the pupil position 1. The reason for this is that the reflecting surface 2 is tilted to a considerable extent in the YZ-plane.

The present invention aims at correcting the pupil aberration produced by the ocular concave mirror 2 and provides a method whereby the height of rays of each field angle at the reflecting concave surface 2 is reduced to suppress occurrence of pupil aberration at the ocular concave mirror 2, which is decentered to a considerable extent in the YZ-plane.

In the present invention, a surface of positive refractive power is disposed between the pupil position 1 and the concave reflecting mirror 2 to reduce the ray height at the concave reflecting surface 2, as shown in Examples (described later). With this arrangement, the angle of divergence of light rays of each field angle is minimized, and the height of rays incident on the concave mirror 2 is lowered. Thus, we have succeeded in minimizing pupil aberration produced by the concave reflecting surface 2.

More preferably, the surface having a positive refractive power should be formed from a positive lens (Example 3). By doing so, surfaces having refractive power are dispersed, and thus occurrence of comatic and other aberrations is minimized.

Figure 3:
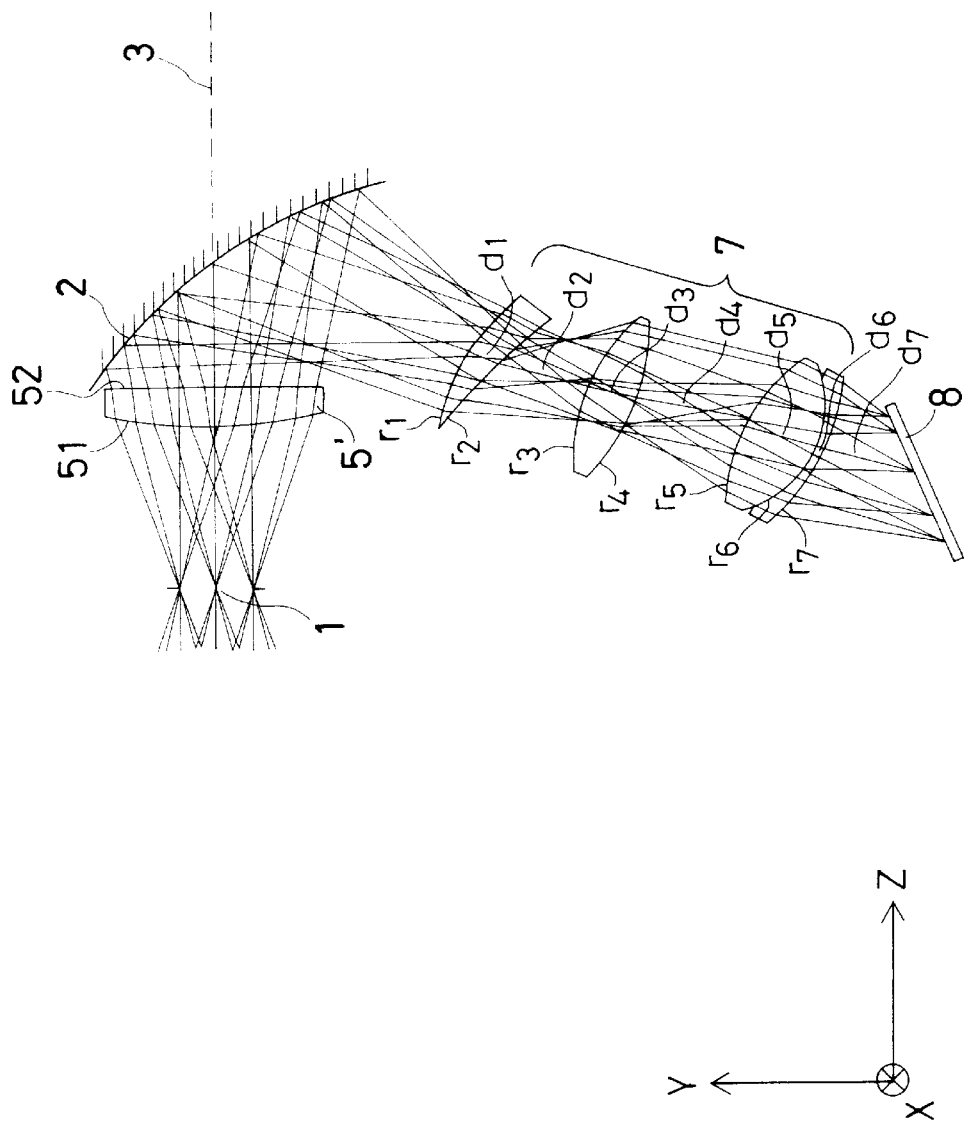
FIG. 3 is a sectional view taken along the YZ-plane, showing an image display apparatus for the observer's right eye according to Example 3 of the present invention.

It is even more preferable to use an aspherical surface as the reflecting surface of the ocular concave mirror 2. By doing so, it is possible to correct pupil aberration of light rays incident on the relay optical system 7 (FIG. 3). Moreover, the aberration correction load on the relay optical system 7 is reduced, and the relay optical system 7 can be reduced in size.

It is also desirable to use an an amorphic surface as the reflecting surface of the ocular concave mirror 2. In this case, it is preferable to set an anamorphic configuration so that the paraxial curvature radius RY in the Y-axis direction is larger than the paraxial curvature radius RX in the X-axis direction ($|R_x < R_y|$). The reason for this is that, by doing so, it becomes possible to suppress complicated astigmatism which occurs because a bundle of light rays obliquely enters the ocular concave mirror 2, and hence possible to enable observation of an image which is clear as far as the edges of the field of view.

Further, it is preferable to dispose the observer's pupil position (exit pupil) 1 at a position further from the ocular concave mirror 2 than the front focal point of the ocular concave mirror 2. By doing so, it becomes possible to minimize the virtual image surface of the infinite object point that is formed by the ocular concave mirror 2, and hence possible to realize an even more compact image display apparatus.

It is also preferable to satisfy the following condition:

$$D > 0.5 \times F_R \quad (1)$$

where $F_R$ is the focal length of the ocular concave mirror 2, and D is the distance between the ocular concave mirror 2 and the observer's iris position (exit pupil) 1.

If D is not larger than $0.5 \times F_R$, the light rays reflected from the ocular concave mirror 2 extremely spread. Consequently, the relay optical system 7 increases in size, resulting in an increase in the overall size of the apparatus.

Further, if the distance between the ocular concave mirror 2 and the observer's iris position 1 or the eyeball rolling point is excessively short, since the ocular concave mirror 2 is disposed immediately in front of the observer's eyeball 1, it may be touched by the observer's eyelashes or terrify the observer. Therefore, it is desirable to dispose the ocular concave mirror 2 so that the distance D between the same and the observer's iris position 1 or the eyeball rolling point is longer than 30 millimeters. That is, it is preferable to sat isfy the following condition:

$$D > 30 \text{ (millimeters)} \quad (2)$$

Examples 1 to 3 of the image display apparatus according to the present invention will be described below with reference to the accompanying drawings. In these examples, a coordinate system is defined with respect to the drawing in such a way that the plane of the drawing is taken as YZ-plane, and a perpendicular extending from the obverse surface to the reverse surface of the drawing in a direction perpendicular to the plane of the drawing is taken as X-axis.

Figure 2:
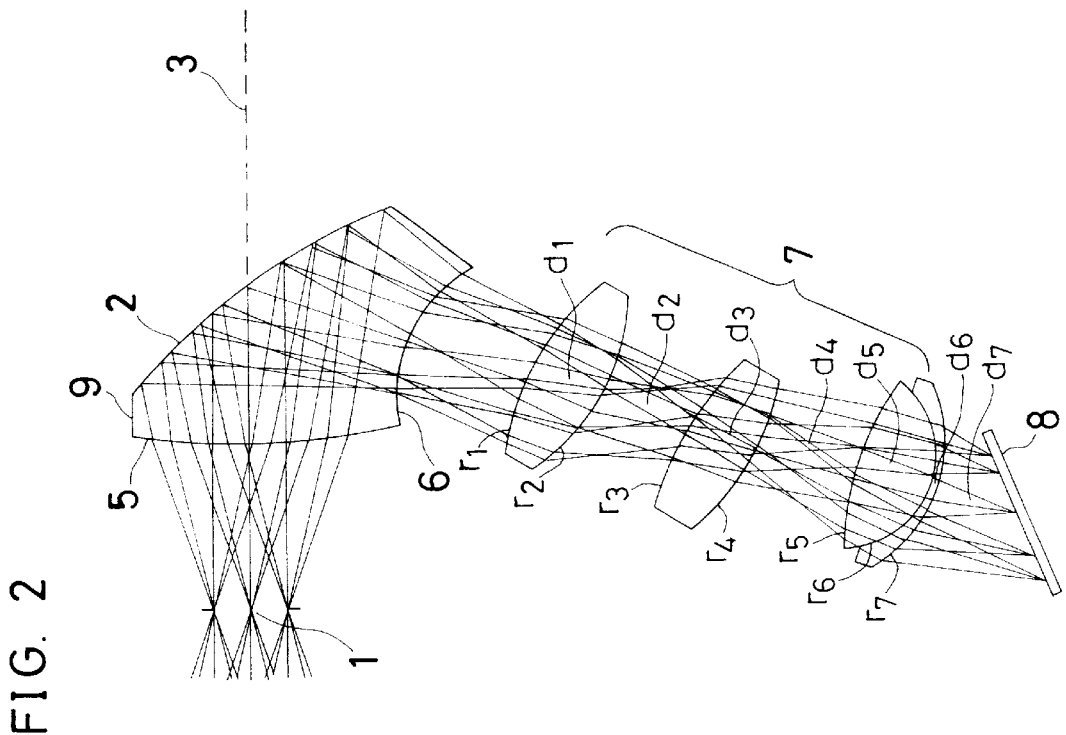
FIG. 2 is a sectional view taken along the YZ-plane, showing an image display apparatus for the observer's right eye according to Example 2 of the present invention.

FIGS. 1 to 3 are sectional views taken along the YZ-plane, respectively showing image display apparatuses for the observer's right eye according to Examples 1 to 3. An image display apparatus for the observer's left eye can be realized by disposing all the constituent optical elements of each example in symmetrical relation to the apparatus for the right eye.

Example 1 will be explained below with reference to FIG. 1. In the figure, reference numeral 1 denotes an observer's pupil position, 2 a concave mirror serving as a second surface of an ocular optical system, 3 an observer's visual axis, 5 a first surface of the ocular optical system, 6 a third surface of the ocular optical system, 7 a relay optical system, 8 a two-dimensional image display device, and 9 a back-coated mirror composed of the first surface 5, the second surface (reflecting surface) 2 and the third surface 6.

Although in the illustrated example the constituent optical elements are arranged such that the visual axis 3 is bent toward the upper side of the observer's head so as to dispose the two-dimensional image display device 8 in the vicinity of the observer's head, it will be apparent that the illustrated arrangement is not necessarily exclusive, and that the optical elements may be disposed so that the visual axis 3 is bent sidewardly of the observer's head.

In Example 1, the horizontal field angle is 50°, while the vertical field angle is 38.5°, and the pupil diameter is 10 millimeters. In this example, the relay optical system 7 is composed of three lens units. The three lens units are decentered with respect to each other.

FIG. 2 is a sectional view taken along the YZ-plane, showing an image display apparatus for the observer's right eye according to Example 2. An image display apparatus for the observer's left eye can be realized by disposing all the constituent optical elements in symmetrical relation to the apparatus for the right eye. Since this example is approximately the same as Example 1, description thereof is omitted.

In Example 2, the horizontal field angle is 50°, while the vertical field angle is 38.5°, and the pupil diameter is 10 millimeters. In this example also, the relay optical system 7 is composed of three lens units, and these lens units are decentered with respect to each other.

FIG. 3 is a sectional view taken along the YZ-plane, showing an image display apparatus for the observer's right eye according to Example 3. An image display apparatus for the observer's left eye can be realized by disposing all the constituent optical elements in symmetrical relation to the apparatus for the right eye. In this example, a surface-coated mirror 2 is used in place of the back-coated mirror, and a positive lens 5' having two convex surfaces 51 is used in place of the first surface. The third surface is omitted in this example. The relay optical system 7 is composed of three lens units which are decentered with respect to each other. In this example, the horizontal field angle is 50°, while the vertical field angle is 38.5°, and the pupil diameter is 10 millimeters.

Constituent parameters of Examples 1 to 3 will be shown below. It should be noted that the surface Nos. are shown as ordinal numbers in backward tracing from the observer's pupil position 1 toward the two-dimensional image display device 8.

As to the amount of decentration (eccentricity) and the tilt angle (inclination angle) in the constituent parameters, the second surface 2 is given an eccentricity and an inclination angle in the Y-axis direction. The eccentricity in the Y-axis direction is a distance by which the vertex of the surface 2 decenters in the Y-axis direction from the visual axis 3 (Z-axis direction) passing through the center of the exit pupil 1. The inclination angle is the angle of the central axis of the surface 2, which passes through the vertex thereof, from the Z-axis. Regarding the third surface 6, the surface separation between the second and third surfaces 2 and 6 is determined along the visual axis 3 reflected at the second surface 2, and a point on the third surface 6 that lies on the reflected visual axis 3 is defined as a reference point. Moreover, a coordinate system is defined as follows: The reflected visual axis 3 is taken as Z-axis, where the direction toward the concave mirror 2 is defined as positive direction; the direction parallel to the plane of the drawing and perpendicular to the Z-axis is taken as Y-axis, where the direction from the right to the left of the two-dimensional image display device 8 is defined as positive direction; and the direction normal to the plane of the drawing is taken as X-axis, where the downward direction is defined as positive direction. With this coordinate system, the third surface 6 is given an eccentricity as a distance by which the vertex thereof decenters from the reference point in the Y-axis direction, and an inclination angle as the angle of inclination of the central axis passing through the vertex from the Z-axis direction. Regarding the relay optical system 7, the first surface thereof is given eccentricities in the Y- and Z-axis directions as distances by which the vertex of the first surface decenters in the Y-and Z-axis directions from the visual axis 3 (Z-axis direction) passing through the center of the exit pupil 1. The first surface of the relay optical system 7 is also given an inclination angle as the angle of inclination of the central axis passing through the vertex thereof from the Z-axis direction. After the first surface, the coordinate system is transformed as follows: First, the central axis of the first surface of the relay optical system 7 is taken as Z-axis, where the direction toward the concave mirror 2 from the two-dimensional image display device 8 is defined as positive direction; the direction parallel to the plane of the drawing and perpendicular to the Z-axis is taken as Y-axis, where the direction from the right to the left of the two-dimensional image display device 8 is defined as positive direction; and the direction normal to the plane of the drawing is taken as X-axis, where the downward direction is defined as positive direction. Thereafter, each of the subsequent surfaces is similarly given an eccentricity and an inclination angle with respect to the coordinate system set for the preceding surface, and the coordinate system is similarly transformed successively. The two-dimensional image display device 8 is given an eccentricity as the distance by which the center thereof decenters in the positive direction of the Y-axis in the coordinate system transformed for the final surface of the relay optical system 7, and an inclination angle as the angle of inclination of the normal to the surface thereof with respect to the Z-axis.

The non-rotationally symmetric aspherical configuration of each surface may be expressed by.

$$Z = [(X^2/R_x) + (Y^2/R_y)]/[1 + \{1 - (1+K_x)(X^2/R_x^2) - (1+K_y)(Y^2/R_y^2)\}^{1/2}] + AR[(1-AP)X^2 + (1+AP)Y^2]^2 + BR[(1-BP)X^2 + (1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the X-direction; $K_y$ is the conical coefficient in the Y-direction; AR and BR are rotationally symmetric 4th- and 6th-order aspherical coefficients, respectively; and AP and BP are asymmetric 4th- and 6th-order aspherical coefficients, respectively.

The rotationally symmetric aspherical configuration of each surface may be expressed by.

$$Z=[(h^2/R)/[1+\{1-(1+K)(h^2/R^2)\}^{1/2}]+Ah^4+Bh^6 (h^2=X^2+Y^2)$$

where R is the paraxial curvature radius; K is the conical coefficient; and A and B are 4th- and 6th-order aspherical coefficients, respectively.

Surface separations are shown as follows: The spacing between the exit pupil 1 and the first surface 5 or the surface 51 of the positive lens 5', the spacing between the surfaces 51 and 52 of the positive lens 5', the spacing between the first and second surfaces 5 and 2, and the spacing between the surface 52 of the positive lens 5' and the second surface 2 are each shown as a distance in the Z-axis direction; the spacing between the second and third surfaces 2 and 6 is shown as a distance along the visual axis 3 reflected from the surface 2 to the above-described reference point; and the spacing between each pair of adjacent surfaces from the first surface of the relay optical system 7 to the image surface thereof (the two-dimensional image display device 8) is shown as a distance along the central axis successively transformed. As to the relay optical system 7, the radii of curvature of the surfaces are denoted by $r_l$ to $r_i$, the surface separations by $d_l$ to $d_i$, the refractive indices for the spectral d-line by $n_l$ to $n_i$, and the Abbe's numbers by $v_l$ to $v_i$. It should be noted that the refractive indices for the spectral d-line of the medium between the first and second surfaces 5 and 2 and between the second and third surfaces 2 and 6 and the medium of the positive lens 5' are denoted by n, and the Abbe's number thereof by v.

| Surface No. | Radius of curvature | | Surface separation | Refractive index (Eccentricity) | Abbe's No. (Inclination angle) |
|---|---|---|---|---|---|
| Example 1 | | | | | |
| 1 (1) | ∞ (pupil) | | 23.000 | | |
| 2 (5) | 162.671 | | 22.000 | n = 1.5163 | v = 64.1 |
| 3 (2) | $R_y$ | −71.084 | −25.000 | n = 1.5163 | v = 64.1 |
| | $R_x$ | −45.105 | | Y: 0 | 35.000° |
| | (reflecting surface) | | | | |
| | $K_y$ | 0 | | | |
| | $K_x$ | 0 | | | |
| | AR | 0.342218 × 10⁻⁶ | | | |
| | BR | 0.606831 × 10⁻⁹ | | | |
| | AP | −0.570899 | | | |
| | BP | −0.119781 | | | |
| 4 (6) | $R_y$ | −13.571 | 0.000 | Y: −5.855 | −23.295° |
| | $R_x$ | −13.560 | | | |
| | $K_y$ | 0 | | | |
| | $K_x$ | 0 | | | |
| | AR | −0.167766 × 10⁻⁹ | | | |
| | BR | 0.174930 × 10⁻⁶ | | | |
| | AP | 0.399476 × 10⁺³ | | | |
| | BP | 0.740068 | | | |
| 5 ($r_1$) | −28.050 | ($d_1$) | −8.697 | $n_1$ = 1.5163 | $v_1$ = 64.1 |
| | K | 0.000 | | Y: −36.173 | 59.882° |
| | A | 0.218511 × 10⁻⁴ | | Z: 34.773 | |
| | B | 0.163510 × 10⁻⁷ | | | |
| 6 ($r_2$) | 22.469 | ($d_2$) | −12.651 | | |
| | K | 0.000 | | | |
| | A | −0.703059 × 10⁻⁵ | | | |
| | B | 0.163404 × 10⁻⁷ | | | |
| 7 ($r_3$) | −18.793 | ($d_3$) | −4.174 | $n_2$ = 1.5163 | $v_2$ = 64.1 |
| | K | 0.000 | | Y: −1.816 | 10.266° |
| | A | 0.291787 × 10⁻⁴ | | | |
| | B | 0.155686 × 10⁻⁶ | | | |
| 8 ($r_4$) | 26.095 | ($d_4$) | −7.057 | | |
| | K | 0.000 | | | |
| | A | −0.882162 × 10⁻⁴ | | | |
| | B | 0.315710 × 10⁻⁶ | | | |
| 9 ($r_5$) | −16.570 | ($d_5$) | −7.667 | $n_3$ = 1.62299 | $v_3$ = 58.2 |
| | | | | Y: −3.599 | 3.783° |
| 10 ($r_6$) | 10.234 | ($d_6$) | −1.000 | $n_4$ = 1.80518 | $v_4$ = 25.4 |
| 11 ($r_7$) | 16.822 | ($d_7$) | −6.717 | | |
| 12 (8) | ∞ (display device) | | | Y: 0.980 | 30.064° |
| Example 2 | | | | | |
| 1 (1) | ∞ (pupil) | | 23.000 | | |
| 2 (5) | 103.000 | | 22.000 | n = 1.5163 | v = 64.1 |
| 3 (2) | $R_y$ | −79.782 | −25.000 | n = 1.5163 | v = 64.1 |
| | $R_x$ | −49.639 | | Y: 0 | 35.000° |
| | (reflecting surface) | | | | |
| | $K_y$ | 0 | | | |
| | $K_x$ | 0 | | | |
| | AR | 0.234914 × 10⁻⁶ | | | |
| | BR | 0.618394 × 10⁻⁹ | | | |
| | AP | −0.541593 | | | |
| | BP | −0.153116 | | | |
| 4 (6) | $R_y$ | −15.885 | 0.000 | Y: −7.520 | −25.716° |
| | $R_x$ | −16.732 | | | |
| | $K_y$ | 0 | | | |
| | $K_x$ | 0 | | | |
| | AR | −0.137862 × 10⁻⁹ | | | |
| | BR | 0.535529 × 10⁻⁷ | | | |
| | AP | 0.513779 × 10⁺³ | | | |
| | BP | 0.100607 × 10⁺¹ | | | |
| 5 ($r_1$) | −27.024 | ($d_1$) | −10.463 | $n_1$ = 1.5163 | $v_1$ = 64.1 |
| | K | 0.000 | | Y: −39.686 | 59.904° |
| | A | 0.170278 × 10⁻⁴ | | Z: 34.642 | |
| | B | 0.262812 × 10⁻⁷ | | | |
| 6 ($r_2$) | 25.179 | ($d_2$) | −12.719 | | |
| | K | 0.000 | | | |
| | A | −0.886697 × 10⁻⁵ | | | |
| | B | 0.939576 × 10⁻⁸ | | | |
| 7 ($r_3$) | −38.920 | ($d_3$) | −9.850 | $n_2$ = 1.5163 | $v_2$ = 64.1 |
| | K | 0.000 | | Y: −1.879 | −1.883° |
| | A | 0.193936 × 10⁻⁴ | | | |
| | B | −0.469704 × 10⁻⁷ | | | |
| 8 ($r_4$) | 25.441 | ($d_4$) | −12.706 | | |
| | K | 0.000 | | | |
| | A | −0.354443 × 10⁻⁴ | | | |
| | B | 0.390162 × 10⁻⁷ | | | |
| 9 ($r_5$) | −38.531 | ($d_5$) | −10.276 | $n_3$ = 1.62299 | $v_3$ = 58.2 |
| | | | | Y: −8.467 | 12.557° |
| 10 ($r_6$) | 13.222 | ($d_6$) | −1.000 | $n_4$ = 1.80518 | $v_4$ = 25.4 |
| 11 ($r_7$) | 19.564 | ($d_7$) | −11.069 | | |
| 12 (8) | ∞ (display device) | | | Y: −0.060 | 42.451° |
| Example 3 | | | | | |
| 1 (1) | ∞ (pupil) | | 23.000 | | |
| 2 (51) | 82.081 | | 5.000 | n = 1.5163 | v = 64.1 |
| 3 (52) | −1088.513 | | 17.000 | | |
| 4 (2) | $R_y$ | −63.745 | −25.000 | Y: 0 | 35.000° |
| | $R_x$ | −42.734 | | | |
| | (reflecting surface) | | | | |
| | $K_y$ | 0 | | | |
| | $K_x$ | 0 | | | |
| | AR | 0.846355 × 10⁻⁶ | | | |
| | BR | 0.730307 × 10⁻⁹ | | | |
| | AP | −0.208795 | | | |
| | BP | −0.375464 | | | |
| 5 ($r_1$) | −264.626 | ($d_1$) | −5.639 | $n_1$ = 1.5163 | $v_1$ = 64.1 |
| | K | 0.000 | | Y: −58.333 | 32.387° |
| | A | −0.739939 × 10⁻⁶ | | Z: 50.562 | |
| | B | −0.136402 × 10⁻⁸ | | | |

-continued

| Surface No. | Radius of curvature | | Surface separation | Refractive index (Eccentricity) | Abbe's No. (Inclination angle) |
|---|---|---|---|---|---|
| 6 ($r_2$) | 755.504 | ($d_2$) | −10.364 | | |
| | K | 0.000 | | | |
| | A | −0.388041 × 10$^{-5}$ | | | |
| | B | 0.122666 × 10$^{-8}$ | | | |
| 7 ($r_3$) | −21.150 | ($d_3$) | −6.903 | $n_2$ = 1.5163 | $v_2$ = 64.1 |
| | K | 0.000 | | Y: 18.781 | 34.580° |
| | A | 0.361789 × 10$^{-4}$ | | | |
| | B | −0.217479 × 10$^{-7}$ | | | |
| 8 ($r_4$) | 23.469 | ($d_4$) | −15.003 | | |
| | K | 0.000 | | | |
| | A | −0.288721 × 10$^{-4}$ | | | |
| | B | 0.883042 × 10$^{-8}$ | | | |
| 9 ($r_5$) | −25.000 | ($d_5$) | −10.196 | $n_3$ = 1.62299 | $v_3$ = 58.2 |
| | | | | Y: −3.852 | −6.201° |
| 10 ($r_6$) | 14.280 | ($d_6$) | −1.000 | $n_4$ = 1.80518 | $v_4$ = 25.4 |
| 11 ($r_7$) | 26.087 | ($d_7$) | −12.228 | | |
| 12 (8) | ∞ (display device) | | | Y: −4.033 | 53.309° |

Figure 4:
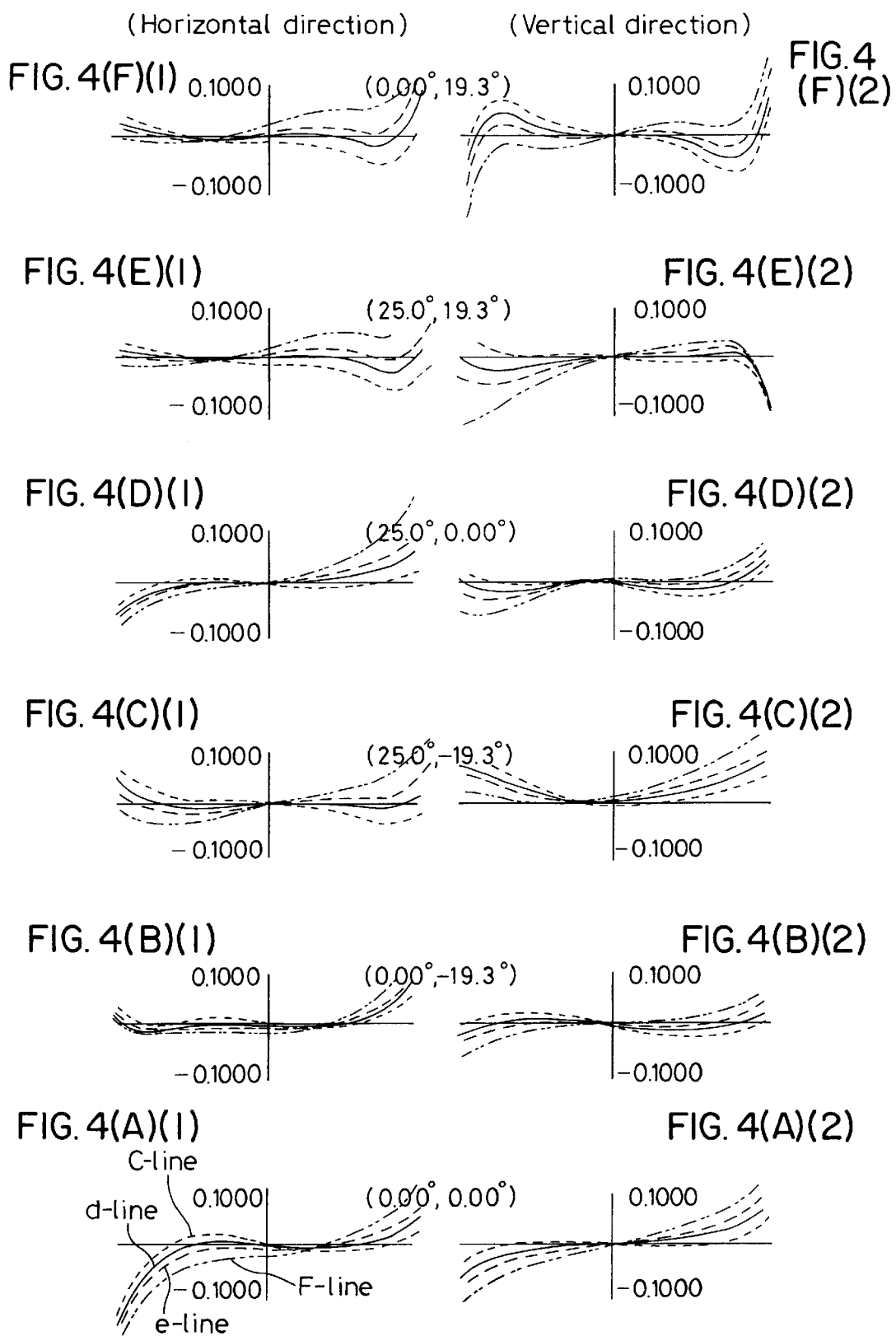
FIGS. 4(A)(1) to 4(F)(2) show some aberration curves illustrating lateral aberration in Example 1.
Figure 5:
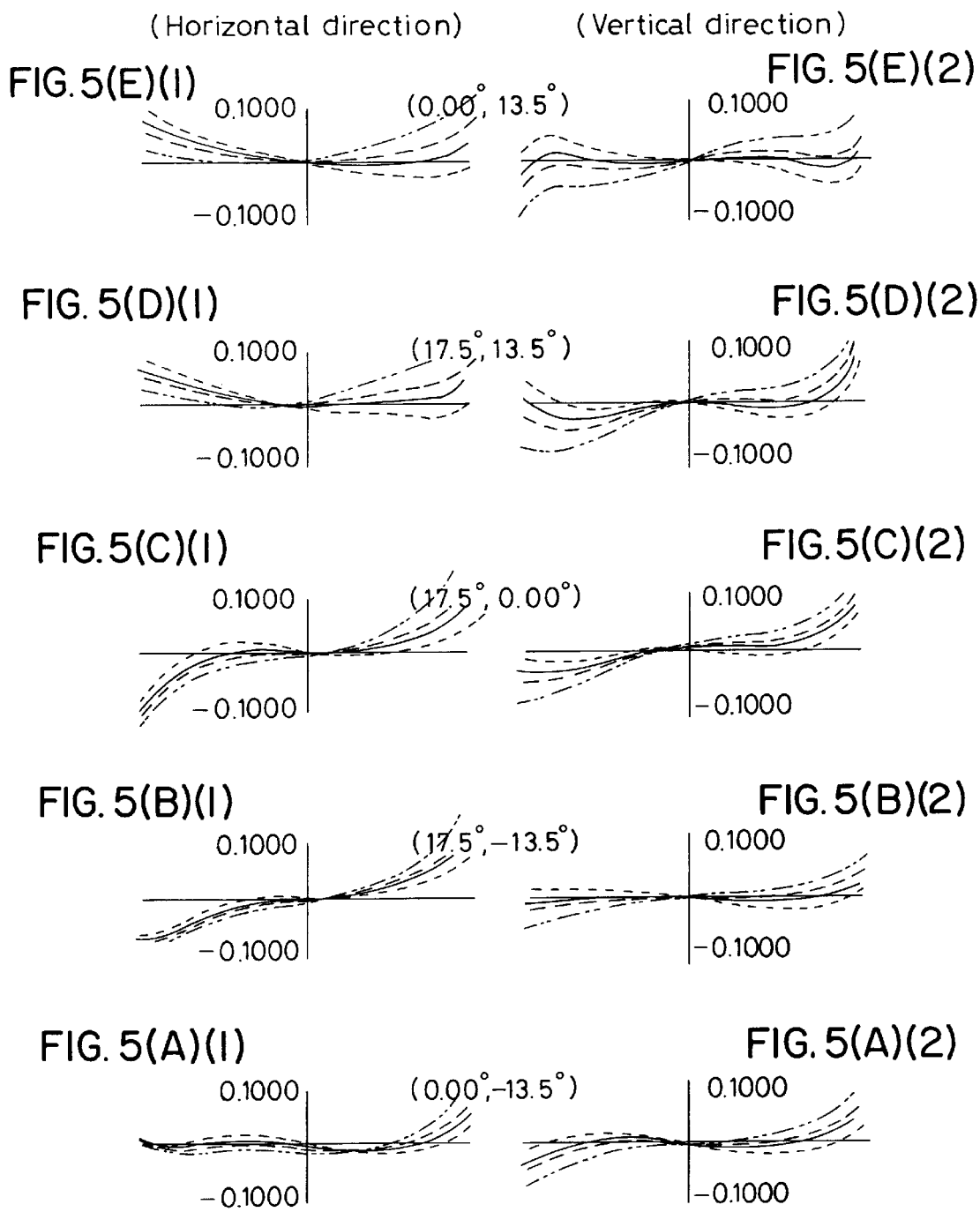
FIGS. 5(A)(1) to 5(E)(2) show other aberration curves illustrating lateral aberration in Example 1.
Figure 6:
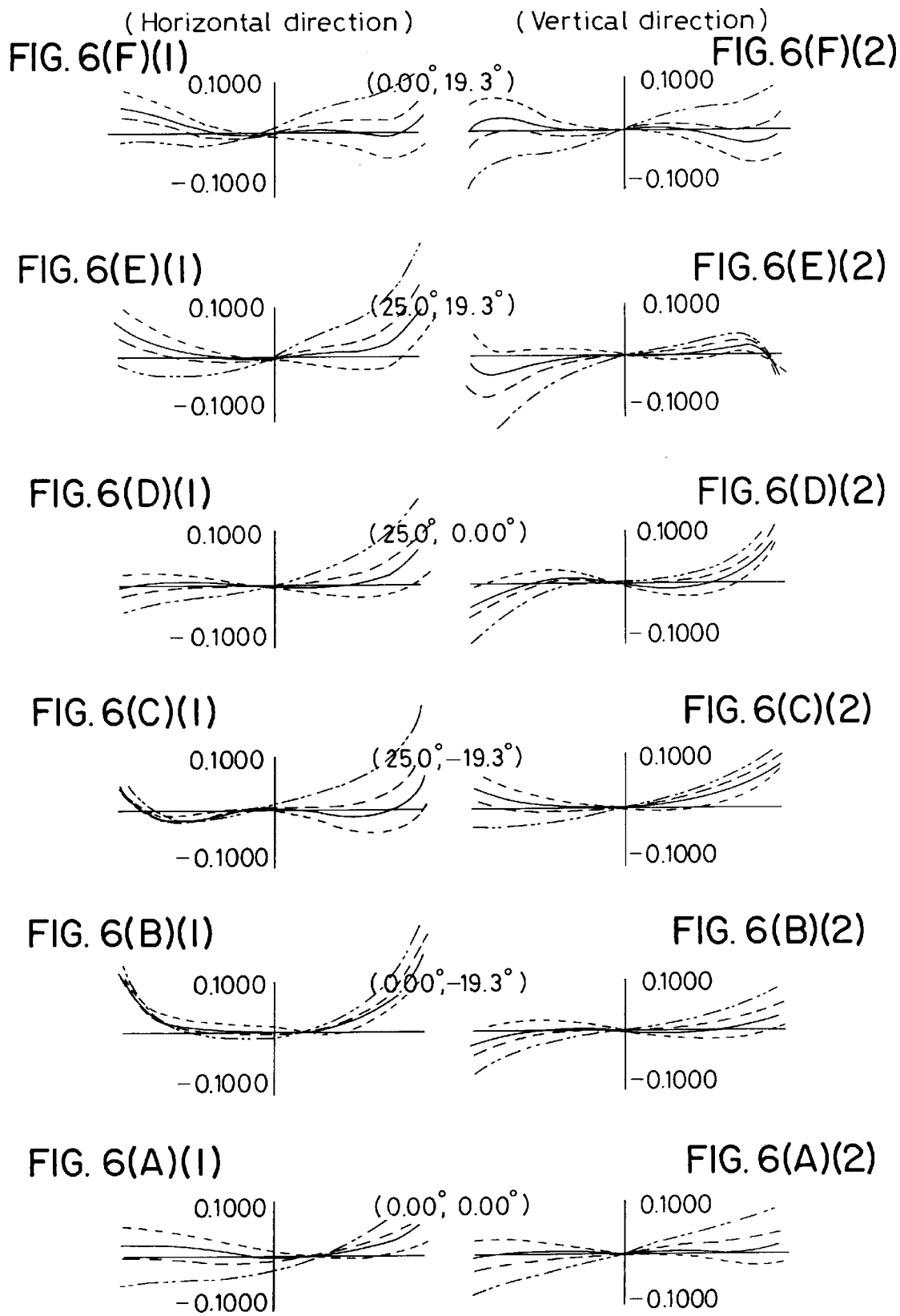
FIGS. 6(A)(1) to 6(F)(2) show some aberration curves illustrating lateral aberration in Example 2.
Figure 7:
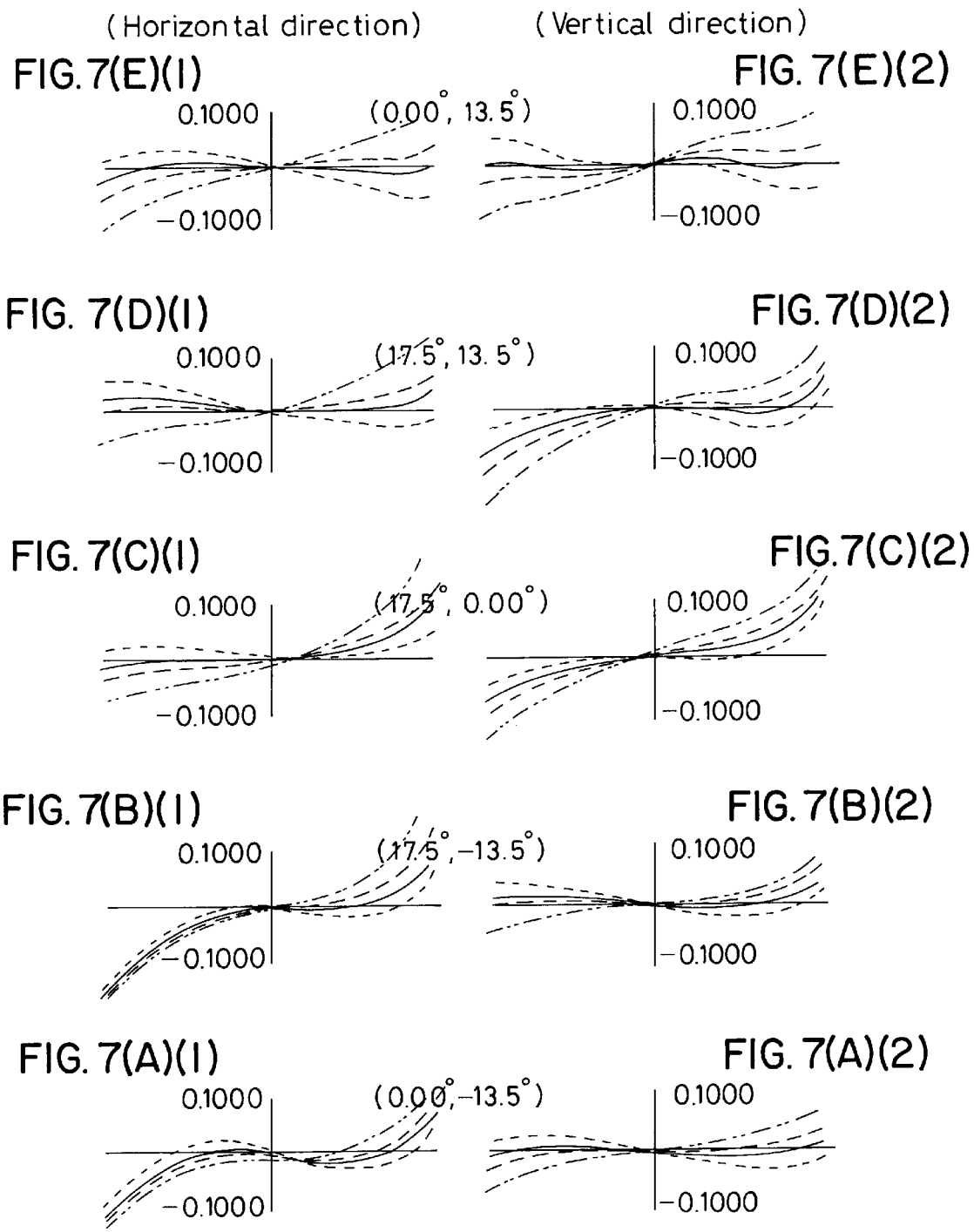
FIGS. 7(A)(1) to 7(E)(2) show other aberration curves illustrating lateral aberration in Example 2.
Figure 8:
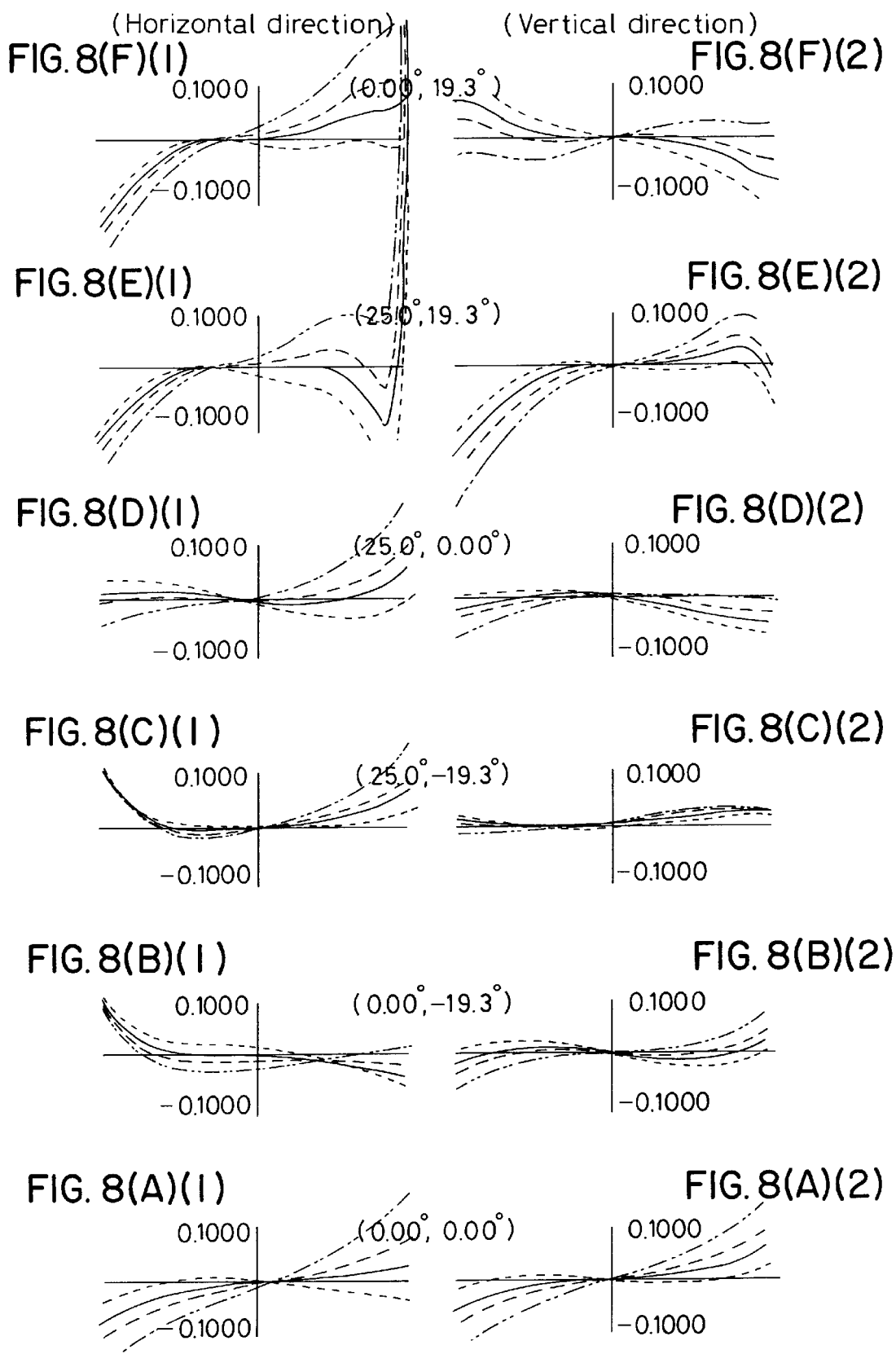
FIGS. 8(A)(1) to 8(F)(2) show some aberration curves illustrating lateral aberration in Example 3.
Figure 9:
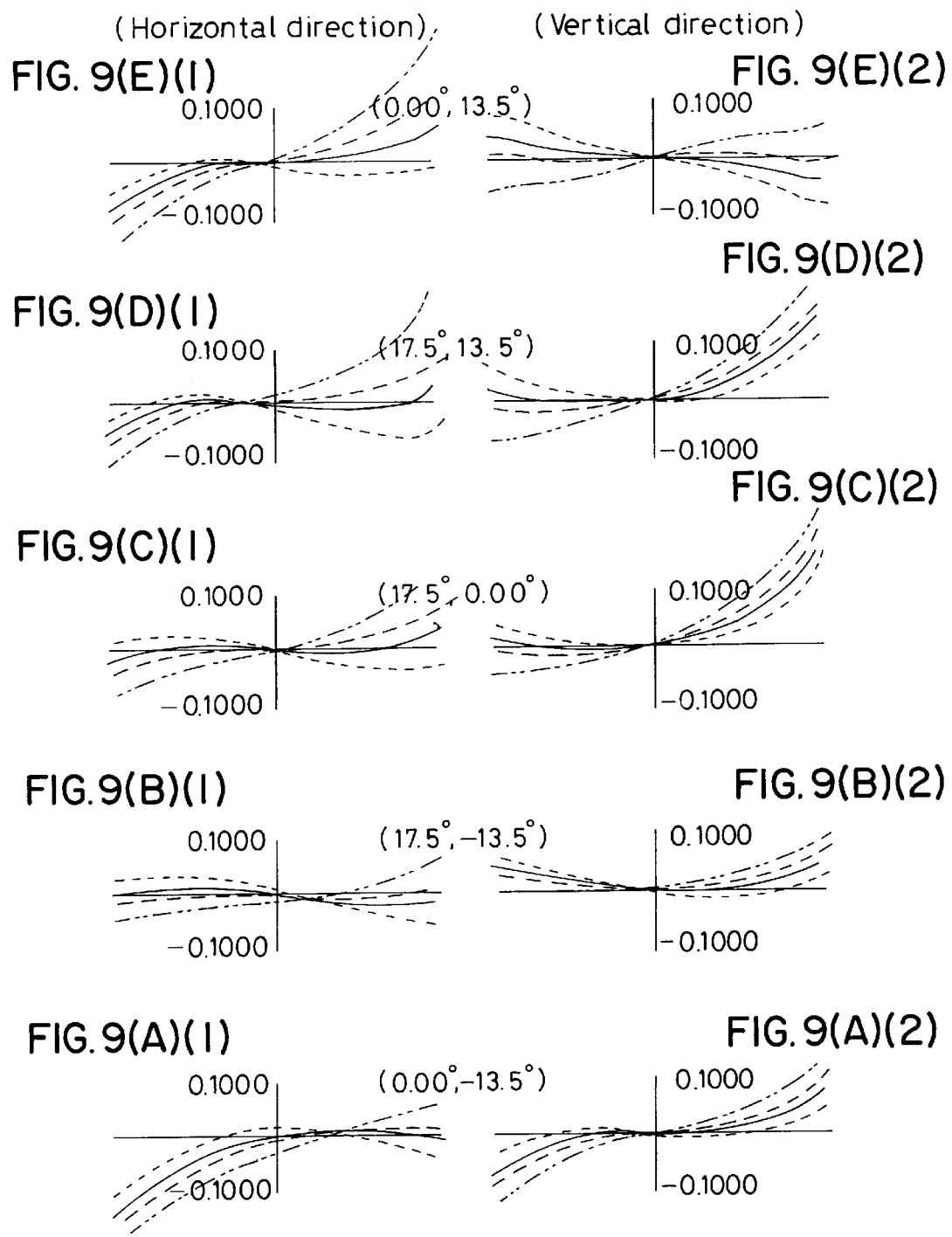
FIGS. 9(A)(1) to 9(E)(2) show other aberration curves illustrating lateral aberration in Example 3.

FIGS. 4(A)(1) to 5(E)(2) graphically show lateral aberration in the horizontal (Y-axis) and vertical (X-axis) directions in Example 1 at various angles to the image field; FIGS. 6(A)(1) to 7(E)(2) similarly show lateral aberration in Example 2; and FIGS. 8(A)(1) to 9(E)(2) similarly show lateral aberration in Example 3. In these figures: FIGS. 4(A)(1), 6(A)(1), 6(A)(2), 8(A)(1), and 8(A)(2) show aberration values in the direction of the visual axis (0° in the vertical direction and 0° in the horizontal direction); FIGS. 4(B)(1), 4(B)(2), 6(B)(1), 6(B)(2), 8(B)(1) and 8(B)(2) show aberration values at 0° in the vertical direction and −19.3° in the horizontal direction; FIGS. 4(C)(1), 4(C)(2), 6(C)(1), 6(C)(2), 8(C)(1) and 8(C)(2) show aberration values at 25° in the vertical direction and −19.3° in the horizontal direction; FIGS. 4(D)(1), 4(D)(2), 6(D)(1), 6(D)(2), 8(D)(1) and 8(D)(2) show aberration values at 25° in the vertical direction and 0° in the horizontal direction; FIGS. 4(E)(1), 4(E)(2), 6(E)(1), 6(E)(2), 8(E)(1) and 8(E)(2) show aberration values at 25° in the vertical direction and 19.3° in the horizontal direction; FIGS. 4(F)(1), 4(f)(2), 6(F)(1), 6(F)(2), 8(F)(1), and 8(F)(2) show aberration values at 0° in the vertical direction and 19.3° in the horizontal direction; FIGS. 5(A)(1), 5(A)(2), 7(A)(1), 7(A)(2), 9(A)(1) and 9(A)(2) show aberration values at 0° in the vertical direction and −13.5° in the horizontal direction; FIGS. 5(B)(1), 5(B)(2), 7(B)(1), 7(B)(2), 9(B)(1) and 9(B)(2) show aberration values at 17.5° in the vertical direction and −13.5° in the horizontal direction; FIGS. 5(C)(1), 5(C)(2), 7(C)(1), 7(C)(2), 9(C)(1) and 9(C)(2) show aberration values at 17.5° in the vertical direction and 0° in the horizontal direction; FIGS. 5(D)(1), 5(D)(2), 7(D)(1), 7(D)(2), 9(D)(1) and 9(D)(2) show aberration values at 17.5° in the vertical direction and 13.5° in the horizontal direction; and FIGS. 5(E)(1), 5(E)(2), 7(E)(1), 7(E)(2), 9(E)(1) and 9(E)(2) show aberration values at 0° in the vertical direction and 13.5° in the horizontal direction.

Figure 10:
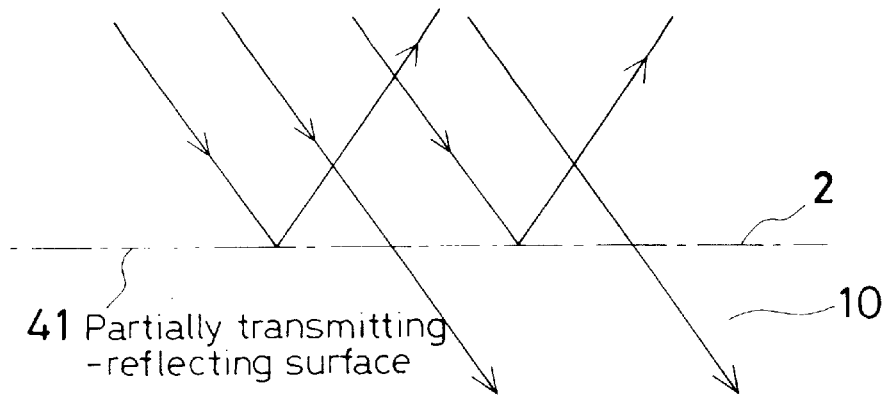
FIGS. 10(a), 10(b) and 10(c) show some forms of a half-mirror usable in the present invention.
Figure 10:
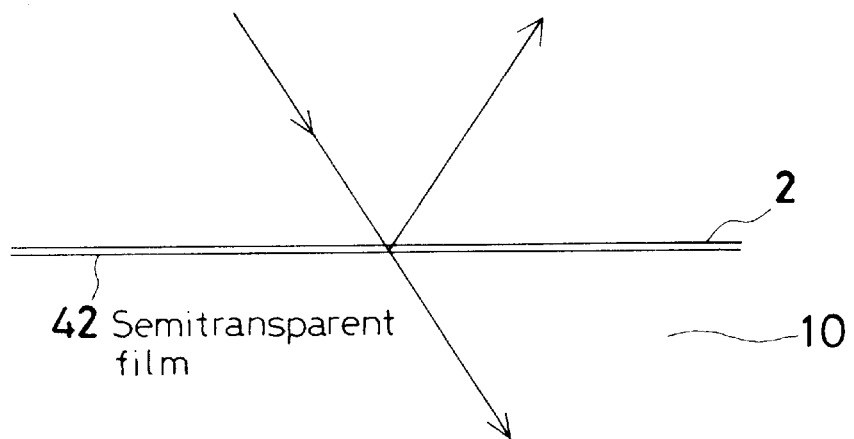
Figure 10:
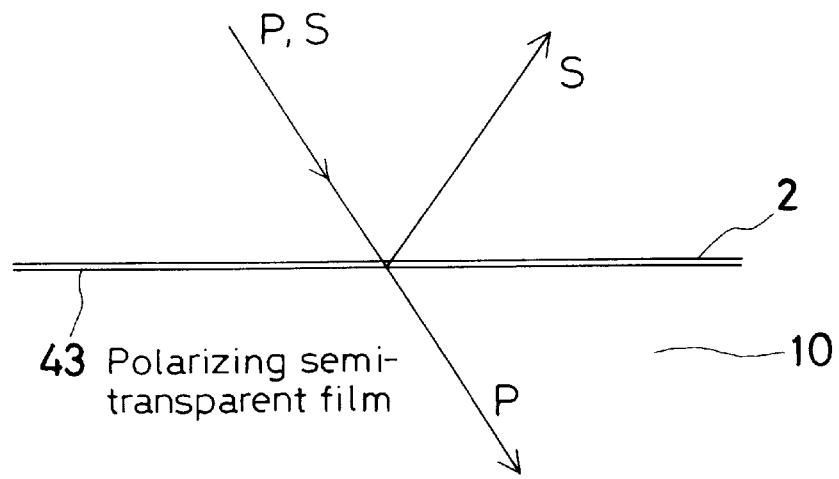

Although the concave mirror 2, which serves as the second surface of the ocular optical system, is assumed to be a totally reflecting mirror in the foregoing description, the concave mirror 2 may be a half-mirror which transmits incident light in a predetermined ratio. Examples of half-mirrors usable in the present invention include those which are shown in FIGS. 10(a) to 10(c), that is, a partially transmitting-reflecting surface 41, a semitransparent film 42 and a polarizing semitransparent film 43, which may be provided on the surface of an optical member 10 constituting the back-coated mirror 9 or the surface-coated mirror 2 (FIG. 3). More specifically, the half-mirror 2 is a surface that transmits about 50% of the quantity of incident light and reflects about 50% of it. The half-mirror 2 may be used with the transmittance-to-reflectance ratio varied in the range of from 1:9 to 9:1, in addition to the above. The half-mirror 2 may be realized by any of the following methods: one in which the bundle of incident rays is divided in terms of area; another in which the bundle of incident rays is divided in terms of light intensity; and another in which the bundle of incident rays is divided in terms of both area and intensity. In the case of the partially transmitting-reflecting surface 41 as shown in FIG. 10(a), the quantity of incident light is divided in terms of area. In this case, reflection coating of aluminum or the like is provided on the surface of the optical member 10 (the refractive index n of which is larger than 1, i.e., n>1) at intervals, for example, in a lattice-like pattern of about several $\mu$m to 0.1 mm, whereby a reflectance and a transmittance are set overall (macrocosmically) by the ratio of the area of the reflecting portions to the area of the transmitting portions. In the case of the semitransparent film 42 as shown in FIG. 10(b), the surface of the optical member 10 (the refractive index n of which is larger than 1, i.e., n>1) is coated with a metallic, extremely thin film, e.g., an extremely thin film of aluminum or chromium, or a dielectric multilayer film of $SiO_2$, $MgF_2$, etc., thereby dividing the quantity of incident light. The polarizing semitransparent film 43 as shown in FIG. 10(c) divides the quantity of incident light by separating polarized light components of the incident light. More specifically, the polarizing semitransparent film 43 is coated on the surface of the optical member 10 (the refractive index n of which is larger than 1, i.e., n>1) to allow p- and s-polarized light components to be selectively transmitted or reflected, thereby dividing the quantity of incident light.

Figure 11A:
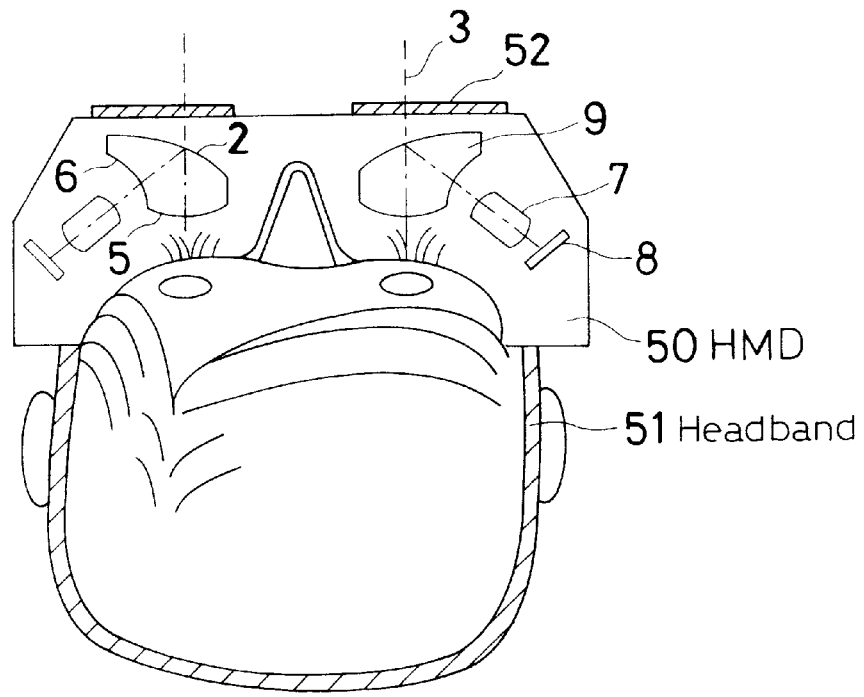
FIGS. 11(a) and 11(b) are a horizontal sectional view and a perspective view, which show a head-mounted image display apparatus according to the present invention.
Figure 11B:
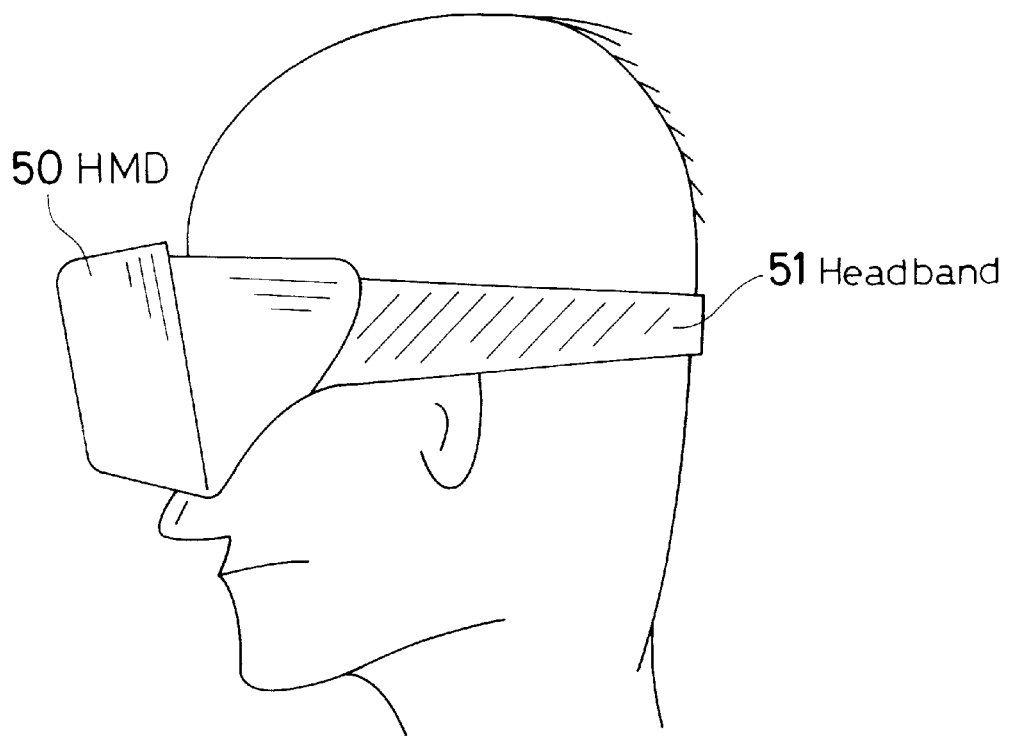
Figure 12:
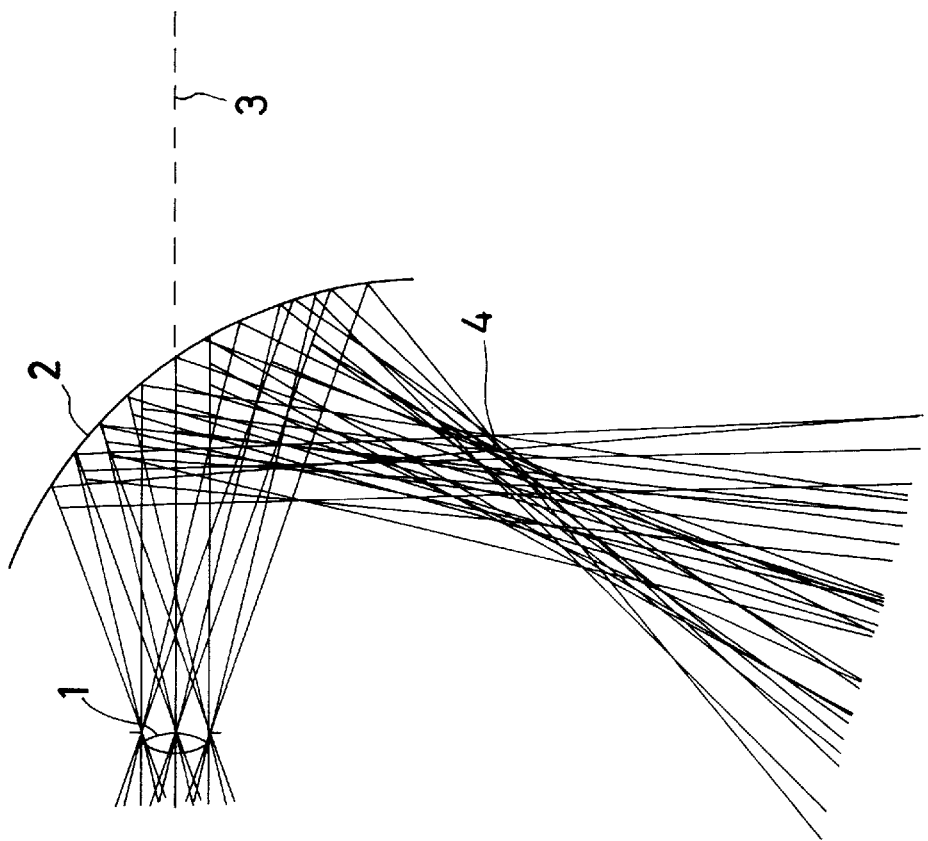
FIG. 12 shows pupil aberration produced by a conventional ocular concave mirror.
Figure 13:
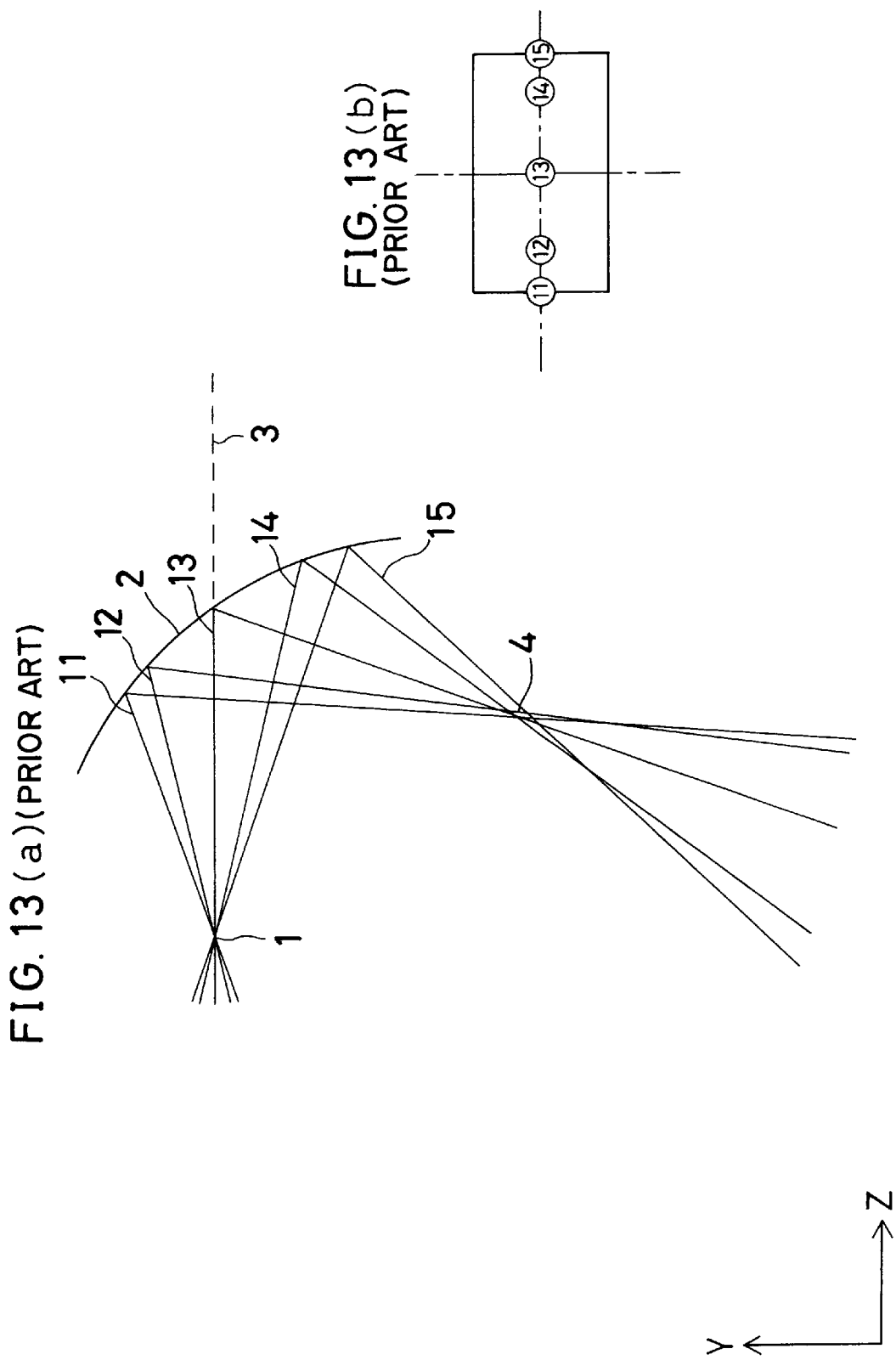
FIGS. 13(a) and 13(b) show pupil aberration in the X-axis direction produced by the conventional ocular concave mirror shown in FIG. 12.

Although the image display apparatus of the present invention has been described above by way of some examples, it should be noted that the present invention is not necessarily limited to these examples, and that various changes and modifications may be imparted thereto. For example, the image display apparatus of the present invention may be arranged in the form of a head-mounted image display apparatus (HMD) 50 as shown in FIGS. 11(a) and 11(b), which are a horizontal sectional view and a perspective view. In this case, the image display apparatus is mounted on the observer's head by using, for example, a headband 51 which is attached to the apparatus. In the case of the arrangement shown in FIG. 11(a), the second surface 2 of the back-coated mirror 9 is formed by using any of the half-mirrors shown in FIGS. 10(a) to 10(c), and a shutter 52 is provided forwardly of the back-coated mirror 9 in the direction of the observer's line of sight 3, thereby enabling an outside world image to be selectively observed or superimposed on the image of the two-dimensional image display device 8 by opening the shutter 52. It should be noted that a similar arrangement can also be formed in a case where a surface-coated mirror 2 as shown in FIG. 3 is used in place of the back-coated mirror 9. In this case, the lens 5' of positive power is used in place of the surface 5 of positive power.

As will be clear from the foregoing description, the present invention makes it possible to provide a head-mounted image display apparatus which enables observation of an image that is clear as far as the edges of visual field at a wide field angle.

What is claimed is:

1. An image display apparatus, comprising:
   an image display device for displaying an image;

a relay optical system for relaying said image to form a relay image; and an ocular optical system including:

a reflecting surface that bends light rays emanating from said relay optical system and forming an exit pupil of said relay image, an entrance-side optical surface provided in an optical path extending from said relay optical system to said reflecting surface, and an exit-side optical surface provided in an optical path along which said light rays bent by said reflecting surface travel to reach said exit pupil, said exit-side optical surface having a power different from that of said entrance-side optical surface, said entrance-side optical surface, said exit-side optical surface and said reflecting surface being integrated in a form of a prism with an optical member having a refractive index (n) larger than 1 (n>1) put therebetween.

2. An image display apparatus according to any one of claim 1, wherein:

said reflecting surface is a totally reflecting surface that reflects incident light rays.

3. An image display apparatus comprising:

an image display device for displaying an image;

a relay optical system for relaying said image to form a relay image; and an ocular optical system including:

a reflecting surface that bends light rays emanating from said relay optical system and forming an exit pupil of said relay image, an entrance-side optical surface provided in an optical path extending from said relay optical system to said reflecting surface, said entrance-side optical surface having a negative power, and an exit-side optical surface provided in an optical path along with said light rays bent by said reflecting surface travel to reach said exit pupil, said exit-side optical surface having a power different from that of said entrance-side optical surface, said exit-side optical surface having a positive power, wherein said reflecting surface is a semitransparent reflecting surface that transmits a part of incident light rays and reflects a remainder of said incident light rays.

4. An image display apparatus, comprising:

an image display device for displaying an image;

a relay optical system for relaying said image to form a relay image; and an ocular optical system including:

a reflecting surface that bends light rays emanating from said relay optical system and forming an exit pupil of said relay image, said reflecting surface being a semitransparent reflecting surface that transmits a part of incident light rays and reflects a remainder of said incident light rays, said reflecting surface being an aspherical surface, at least an optical surface of positive power in an optical path along which said light rays bent by said reflecting surface travel to reach said exit pupil.

5. An image display apparatus comprising:

a face-mounted unit which includes an image display device for displaying an image;

a relay optical system for relaying said image to form a relay image;

an ocular optical system including:

a reflecting surface that bends light rays emanating from said relay optical system and forming an exit pupil of said relay image, said reflecting surface being a semitransparent reflecting surface that transmits a part of incident light rays and reflects a remainder of said incident light rays, said reflecting surface being an aspherical surface, and at least an optical surface of positive power in an optical path along which said light rays bent by said reflecting surface travel to reach said exit pupil; and a support member for retaining said face-mounted unit on an observer's head.

6. An image display apparatus according to any one of claim 1, 4 or 5, wherein:

said reflecting surface a concave reflecting mirror having a positive power.

7. An image display apparatus according to any one of claim 1, 4, or 5 wherein:

said relay optical system is formed from a plurality of optical elements, at least one of said optical elements being decentered with respect to an axis perpendicular to said image.

8. An image display apparatus according to claim 1, wherein:

said reflecting surface is a semitransparent reflecting surface that transmits a part of incident light rays and reflects a remainder of said incident light rays.

9. An image display apparatus according to claim 3 or 8 wherein:

said semitransparent reflecting surface is a surface composed of transmitting and reflecting regions which are locally divided from each other.

10. An image display apparatus according to claim 3 or 8 wherein:

said semitransparent reflecting surface is formed from a semitransparent thin film which divides a quantity of incident light.

11. An image display apparatus according to claim 10, wherein:

said semitransparent thin film is a metallic thin film.

12. An image display apparatus according to claim 10, wherein:

said semitransparent thin film is a dielectric multilayer film.

13. An image display apparatus, comprising:

an image display device for displaying an image; a relay optical system for relaying said image to form a relay image; and an ocular optical system including:

a reflecting surface that bends light rays emanating from said relay optical system and forming an exit pupil of said relay image, said reflecting surface being an aspherical surface, an entrance-side optical surface provided in an optical path extending from said relay optical system to said reflecting surface, and an exit-side optical surface provided in an optical path along which said light rays bent by said reflecting surface travel to reach said exit pupil, said exit-side optical surface having a power different from that of said entrance-side optical surface.

14. An image display apparatus, comprising:

an image display device for displaying an image;

a relay optical system for relaying said image to form a relay image; and an ocular optical system including:

a reflecting surface that bends light rays emanating from said relay optical system and forming an exit pupil of said relay image, said reflecting surface being an aspherical surface, and at least an optical surface of positive power in an optical path along which said light rays bent by said reflecting surface travel to reach said exit pupil.

15. An image diplay apparatus according to any of claims 13 or 14, wherein:

said reflecting surface is an anamorphic surface.

16. An image display apparatus according to claim 15, wherein said anamorphic surface satisfies the following condition:

$$|R_x| < |R_y|$$

where $R_x$ is a paraxial curvature radius in an X-axis direction, and $R_y$ is a paraxial curvature radius in a Y-axis direction.

17. An image display apparatus, comprising:

an image display device for displaying an image;

a relay optical system for relaying said image to form a relay image; and an ocular optical system including:

a reflecting surface that bends light rays emanating from said relay optical system and forming an exit pupil of said relay image, said reflecting surface being an aspherical surface, and at least an optical surface of positive power in an optical path along which said light rays bent by said reflecting surface travel to reach said exit pupil;

said image display apparatus satisfying the following condition:

$$D > 30 \text{ (millimeters)}$$

where D is a distance between said reflecting surface and said exit pupil.

18. An image display apparatus comprising:

a face-mounted unit which includes an image display device for displaying an image;

a relay optical system for relaying said image to form a relay image;

an ocular optical system including:

a reflecting surface that bends light rays emanating from said relay optical system and forming an exit pupil of said relay image, said reflecting surface being an aspherical surface, and at least an optical surface of positive power in an optical path along which said light rays bent by said reflecting surface travel to reach said exit pupil; and a support member for retaining said face-mounted unit on an observer's head;

said image display apparatus satisfying the following condition:

$$D > 30 \text{ (millimeters)}$$

where D is a distance between said reflecting surface and said exit pupil.

19. In an image display apparatus comprising:

a face-mounted unit including an image display device having an image display surface for displaying an image, and an ocular optical system for leading said image to an observer's eyeball, and a support member for retaining said face-mounted unit on an observer's head;

the improvement wherein said ocular optical system includes:

at least an entrance-side optical surface, a reflecting surface, and an exit-side optical surface;

said entrance-side optical surface, said reflecting surface and said exit-side optical surface being integrated in a form of a prism with an optical member having a refractive index (n) larger than 1(n>1) disposed therebetween;

said entrance-side optical surface being disposed to face said image display surface so that light rays emanating from said image display surface can enter said prism through said entrance-side optical surface;

said reflecting surface being disposed on an observers visual axis to reflect the light ray that entered through said entrance-side optical surface so that said light rays can pass through said prism and exit from said exit-side optical surface;

said exit-side optical surface being disposed on said observer's visual axis closer to said observer's eyeball than said reflecting surface so that said light rays reflected by said reflecting surface can be led to said observer's eyeball; and said reflecting surface being an aspherical surface having an effect of correcting aberrations produced by said prism.

20. An image display apparatus according to claim 19, wherein said prism has a configuration in which a spacing between said reflecting surface and said exit-side optical surface is wider at a side of said prism closer to said entrance-side optical surface than at a side of said prism remote from said entrance-side optical surface.

21. A image display apparatus according to claim 19 or 20, wherein said reflecting surface has a configuration in which a surface configuration in a YZ-section in a direction in which said light rays are bent by said reflecting surface differs from a surface configuration in an XZ-section perpendicular to said YZ-section.

22. An image display apparatus according to claim 21, wherein said reflecting surface satisfies the following condition:

$$|R_x| < |R_y|$$

where $R_x$ is a paraxial curvature radius in an X-axis direction, and $R_y$ is a paraxial curvature radius in a Y-axis direction.

23. An image display apparatus according to claim 22, wherein said reflecting surface is an anamorphic surface.

24. An image display apparatus according to claim 19 or 20, wherein said prism forms an exit pupil, which defines an observer's eyeball position, by using said light ray bundle emanating from said image display surface.

25. An image display apparatus according to claim 24, wherein said prism satisfies the following condition:

$$D > 30 \text{ (millimeters)}$$

where D is a distance between said reflecting surface and said exit pupil.

26. An image display apparatus according to claim 19 or 20, wherein said reflecting surface is concave toward said observer's eyeball and convex away from said observer's eyeball.

27. An image display apparatus according to claim 19 or 20, wherein said exit-side optical surface is convex toward said observer's eyeball as viewed in YZ-section.

28. An image display apparatus according to claim 19 or 20, wherein said entrance-side optical surface is concave as viewed in a YZ-section.

29. An image display apparatus according to claim 19 or 20, wherein said exit-side optical surface is a non-plane surface.

30. An image display apparatus according to claim 29, wherein said entrance-side optical surface is a non-plane surface.

31. An image display apparatus according to claim 19 or 20, wherein said ocular optical system has a field angle of not less than 40° in a horizontal direction in which said observer's left and right eyes align with each other.

32. An image display apparatus according to claim 31, wherein said ocular optical system has a field angle of not less than 20° in a rightward direction with respect to said visual axis and a field angle of not less than 20° in a leftward direction with respect to said visual axis, so that said ocular optical system has a composite field angle of not less than 40°.

33. An image display apparatus, comprising:

an image display device for displaying an image;

a relay optical system for relaying said image to form a relay image; and an ocular optical system including:

a reflecting surface that bends light rays emanating from said relay optical system and forming an exit pupil of said relay image, said reflecting surface being a semitransparent reflecting surface that transmits a part of incident light rays and reflects a remainder of said incident light rays, at least an optical surface of positive power in an optical path along which said light rays bent by said reflecting surface travel to reach said exit pupil, said relay optical system being formed from a plurality of optical elements, at least one of said optical elements being decentered with respect to an axis perpendicular to said image.

34. An image display apparatus comprising:

a face-mounted unit which includes an image display device for displaying an image;

a relay optical system for relaying said image to form a relay image;

an ocular optical system including:

a reflecting surface that bends light rays emanating from said relay optical system and forming an exit pupil of said relay image, said reflecting surface being a semitransparent reflecting surface that transmits a part of incident light rays and reflects a remainder of said incident light rays, and at least an optical surface of positive power in an optical path along which said light rays bent by said reflecting surface travel to reach said exit pupil; and a support member for retaining said face-mounted unit on an observer's head, said relay optical system being formed from a plurality of optical elements, at least one of said optical elements being decentered with respect to an axis perpendicular to said image.

* * * * *